United States Patent [19]

Nose et al.

[11] Patent Number: 5,025,395

[45] Date of Patent: Jun. 18, 1991

[54] DATA PROCESSING SYSTEM CAPABLE OF EXECUTING DATA PROCESSING USING RESOURCES BY DESIGNATING DISPLAYED GRAPHIC PATTERNS REPRESENTING SELECTED RESOURCES

[75] Inventors: Toshiro Nose, Tokyo; Hisashi Hashimoto, Yokohama, both of Japan; Masato Manda, West Lebanon, N.H.

[73] Assignee: Hitachi, Ltd., Tokyo, Japan

[21] Appl. No.: 15,026

[22] Filed: Feb. 17, 1987

[30] Foreign Application Priority Data

Feb. 21, 1986 [JP] Japan .................................. 61-35152

[51] Int. Cl.$^5$ .............................................. G06F 9/44
[52] U.S. Cl. ...................................... 364/518; 364/521
[58] Field of Search ............... 364/138, 146, 147, 518, 364/521, 300, 900 MS File

[56] References Cited

U.S. PATENT DOCUMENTS

| | | | |
|---|---|---|---|
| 4,365,315 | 12/1982 | Jamnik | 364/147 X |
| 4,486,830 | 12/1984 | Taylor, Jr. et al. | 364/146 |
| 4,497,040 | 1/1985 | Gomes et al. | 364/146 X |
| 4,604,653 | 8/1986 | Shimizu | 364/518 X |
| 4,656,603 | 4/1987 | Dunn | 364/521 X |
| 4,754,395 | 6/1988 | Weisshaar et al. | 364/300 X |
| 4,835,685 | 5/1989 | Kun | 364/200 |

*Primary Examiner*—Dale M. Shaw
*Assistant Examiner*—Mark K. Zimmerman
*Attorney, Agent, or Firm*—Antonelli, Terry, Stout & Kraus

[57] ABSTRACT

A data processing system including a display unit for displaying a plurality of graphic patterns and names thereof corresponding to resources, and an input unit for selectively designating objects to be processed from graphic patterns or names being displayed. A file is provided for registering the graphic patterns and names corresponding to the resources in connection with each user. The graphic patterns and the names thereof specific to a user are read out from the file on the basis of user identifying information inputted in precedence to the data processing and this read out data is displayed on the display unit.

13 Claims, 9 Drawing Sheets

| ITEM | FUNCTION | CONTENTS |
|---|---|---|
| 1 | CREATION OF OBJECT | CREATION OF OBJECT AND ITS PROFILE INFORMATION |
| 2 | DELETION OF OBJECT | DELETION OF OBJECT AND ITS PROFILE INFORMATION |
| 3 | READING OF PROFILE INFORMATION FILE | READING OUT OF COMMON INFORMATION AND CONCERNED PRIVATE INFORMATION FROM PROFILE INFORMATION FILE |
| 4 | WRITING OF PROFILE INFORMATION FILE | WRITING OF COMMON INFORMATION AND CONCERNED PRIVATE INFORMATION IN PROFILE INFORMATION FILE |
| 5 | UPDATE OF PROFILE INFORMATION FILE | UPDATE OF COMMON INFORMATION AND CONCERNED PRIVATE INFORMATION IN PROFILE INFORMATION FILE |
| 6 | COLLECTIVE READING OF PROFILE INFORMATION FILE | READING OUT OF COMMON INFORMATION AND CONCERNED PRIVATE INFORMATION FROM PLURALITY OF PROFILE INFORMATION FILES CORRESPONDING TO OBJECTS WHICH ARE REGISTERED IN THE DIRECTORY |
| 7 | MOVEMENT OF OBJECT | MOVEMENT OF OBJECT AND ITS PROFILE INFORMATION |
| 8 | COPY OF OBJECT | COPYING OF OBJECT AND ITS PROFILE INFORMATION |

DATA PROCESSING SYSTEM CAPABLE OF EXECUTING DATA PROCESSING USING RESOURCES BY DESIGNATING DISPLAYED GRAPHIC PATTERNS REPRESENTING SELECTED RESOURCES

BACKGROUND OF THE INVENTION

1. Field of the Invention

The present invention generally relates to a data processing system for displaying in the form of graphic patterns resources to be used in processing by the system. More particularly, the invention is concerned with an improvement of a user interface (man-machine interface) in a data processing system, such as a work station, high-performance personal computer and the like, appropriate for use in offices.

2. Description of the Prior Art

As a hitherto known means for facilitating interaction or communication between a user and a machine in a work station, a system has attracted attention in which resources usable by a user are taken for objects which are then displayed in terms of picture/character graphic patterns (hereinafter also referred to as the icon graphic pattern or simply as an icon or graphic pattern), wherein the user selects the objects to be used from the icons displayed, being followed by commanding a procedure to be executed using the selected object, to thereby proceed with the data processing. In this connection, reference may be made, for example, to an article entitled "Technology for Implementing User Interface of Work Station" in a Japanese publication "Information Processing", Vol. 25, No. 2 (February 1984), pp. 103–110, published by "Information Processing Society of Japan".

In the hitherto known system, however, the icon graphic patterns are inherently specific to the system and it was impossible to adopt the particular icon patterns in conformance with the environment in which the user works. Besides, in the hitherto known system, a plurality of names of displays can not be imparted to a single resource, differing from the case of logic names for a file, by way of example.

Such being the circumstances, when the prior art work station is to be applied to a multi-user environment in which one and the same apparatus or system is to be alternately used by a plurality of users, it is impossible to implement on the display unit the work environment optimum to each user, who is thus forced to use the ready-made icon graphic patterns and the resource display names.

SUMMARY OF THE INVENTION

An object of the present invention is to provide an improved user interface (man-machine interface) for a data processing system which can be used in a multi-user environment.

Another object of the present invention is to improve manipulatability of a data processing system which is capable of displaying graphic patterns corresponding to resources on a display screen and executing data processing by designating particular graphic patterns.

With a view to accomplishing the objects mentioned above, there is provided according to the present invention a data processing system for displaying resources, which are available for use in data processing in the form of graphic patterns, which system comprises first file means for storing resource identifying information to identify resources to be used in executing data processing by users in correspondence with user identifying information for identifying individual users, second file means for storing the graphic patterns and names thereof specific to each user in correspondence with each of the resources, display means including a screen capable of displaying a plurality of graphic patterns and names thereof, input means for inputting user identifying information in precedence to execution of data processing, control means responding to the inputting of the user identifying information for reading out the identifying information of the corresponding resources from the first file means while reading out the graphic patterns and the names thereof specific to the user and corresponding to aforementioned resources from the second file means to be outputted to the display means, and designating means for designating selectively one of plural graphic patterns or names thereof displayed by the display means, wherein data processing is performed using the resources corresponding to the designated graphic patterns or names.

According to the present invention, graphic patterns (icons) and names of resources are filed on a user-by-user basis so as to be retrievable with the aid of user identifying information (also referred to as user ID). At the beginning of operation of the work station, the aforementioned file can be retrieved by utilizing the user ID as a key code to thereby display the resources in terms of the graphic patterns and the names particular or proper to the user. In this way, the user can realize the work environment peculiar to him or her on the display screen. In other words, a work station which is easy to use can thus be implemented. Further, since information to be displayed is stored in the file, addition and alteration (such as updating and modification) of the information can be readily accomplished.

The foregoing and other objects, advantages, manner of operation and novel features of the present invention will be more fully understood from the following detailed description when read in connection with the accompanying drawings.

DESCRIPTION OF THE PREFERRED EMBODIMENTS

Now, the invention will be described in conjunction with exemplary embodiments thereof by reference to the accompanying drawings.

Figure 1:
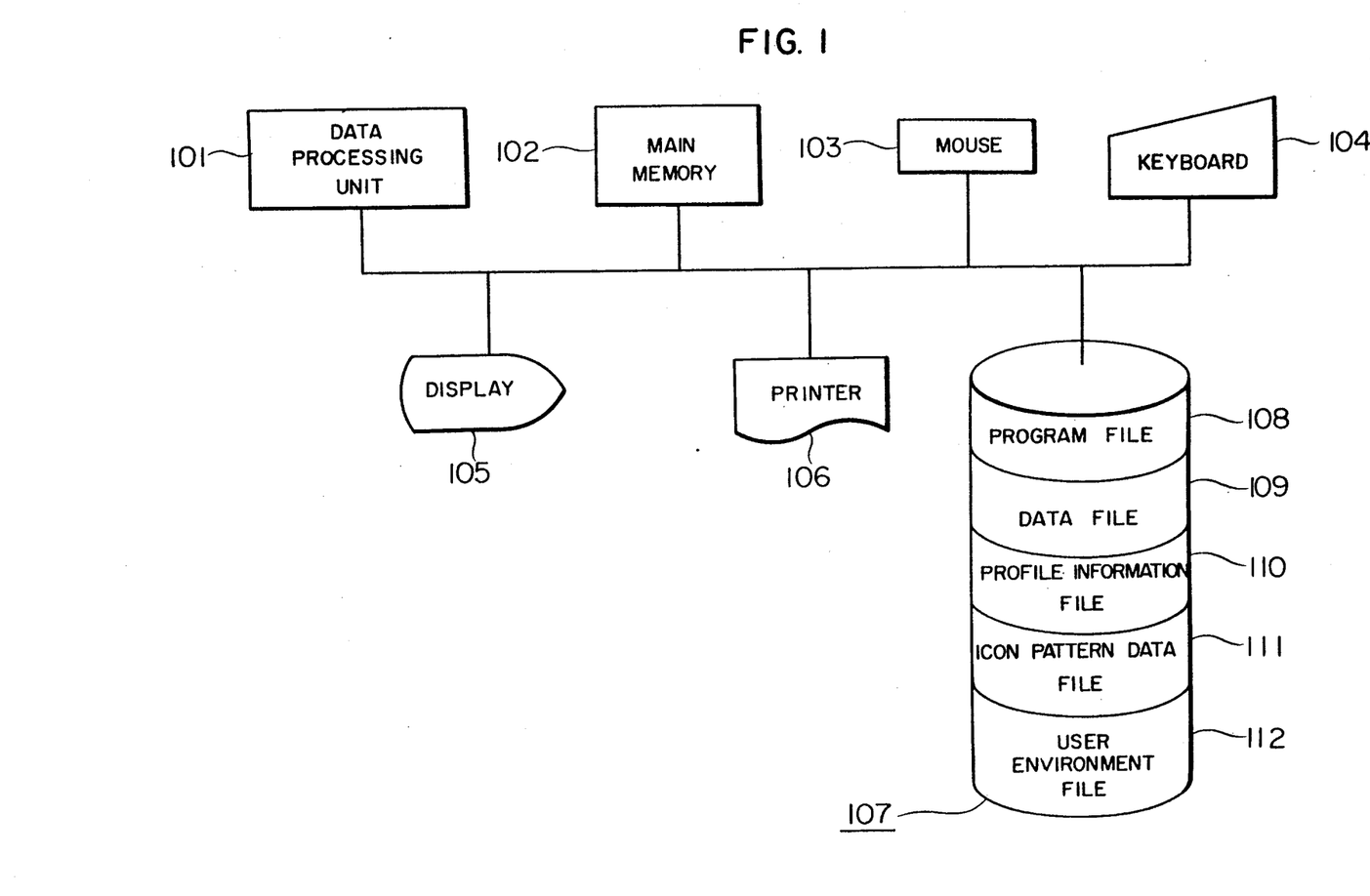
FIG. 1 is a view showing in a block diagram a general arrangement of a work station to which the present invention can be applied.

FIG. 1 shows a general arrangement of a work station for carrying out the present invention. In this figure, a reference numeral 101 denotes a data processing unit, 102 denotes a main memory, 103 denotes a mouse which constitutes a pointing input unit, 104 denotes a keyboard for inputting commands and data, 105 denotes a display unit such as a bit map display, 106 denotes a printer, and a numeral 107 denotes an auxiliary storage (e.g. memory disc). The memory disc 107 includes a program storing region (also referred to as the program file) 108, a user data file region 109, a profile (or attribute) information file region 110 for storing profile (or attribute) information of objects to be handled in the work station, an icon pattern data file region 111 for storing icon pattern data representative of the objects, and a user environment file region 112 for storing all the names of objects possibly used by individual users on a user identification (ID) basis.

Figure 2:
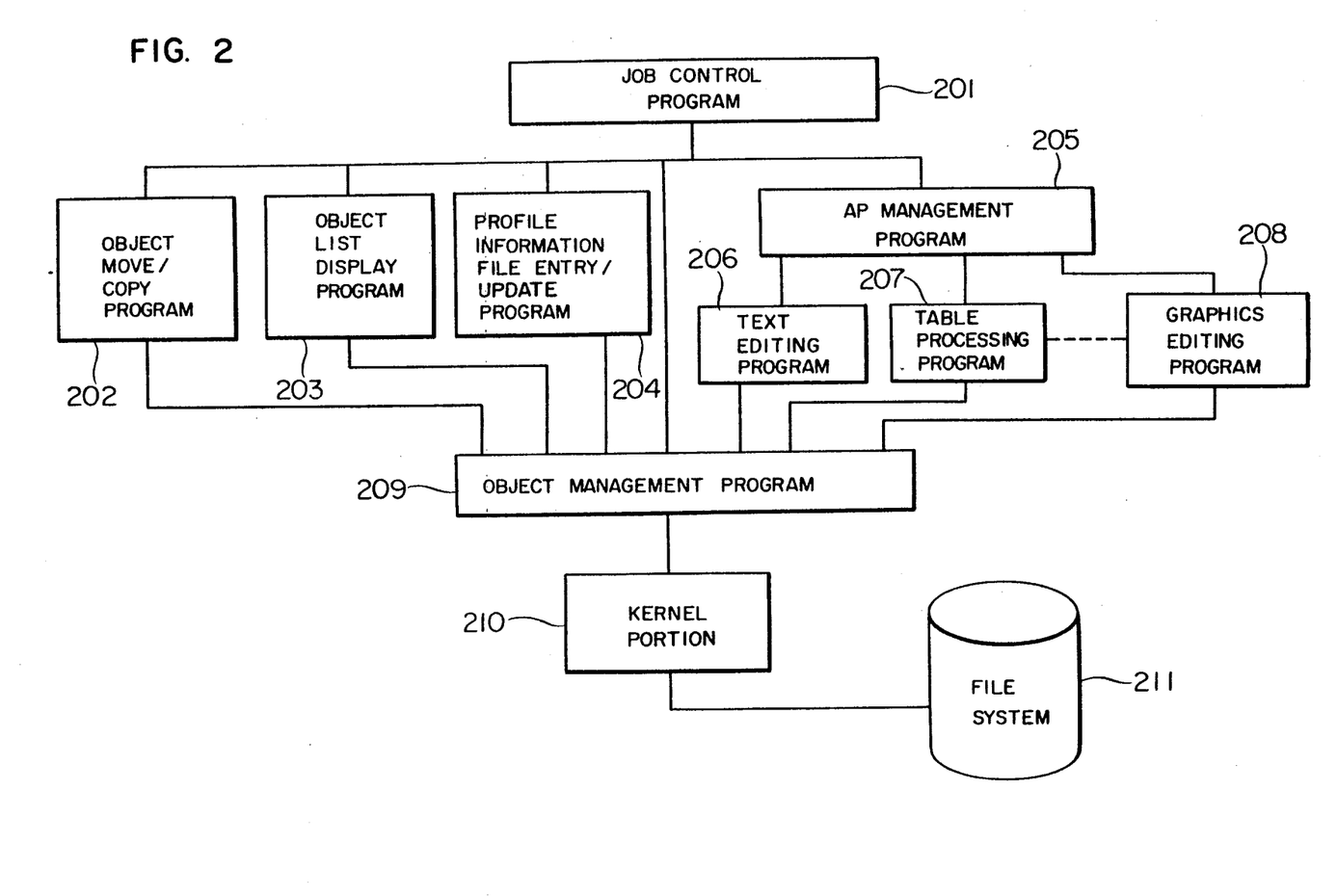
FIG. 2 is a view showing an arrangement of programs provided for the work station shown in FIG. 1.

FIG. 2 is a view for illustrating a variety of programs prepared in the program storage region 108 of the disc unit 107 as well as relationships therebetween. In FIG. 2, a reference numeral 201 denotes a job control program for controlling execution of various processing programs mentioned below, 202 denotes a program for performing a object moving/copying operation, 203 denotes a program for displaying in a list contents of an object when it is a directory, 204 denotes a program designed for registration (entry)/updating of the profile (attribute) information stored in the profile information file 110, 205 denotes an AP management program for loading APs (abbreviation of application programs) required for processing the object designated by the user, numerals 206, 207 and 208 denote a text editing program, a table processing program and a graphics editing program, respectively, which exemplify the AP programs, a numeral 209 denotes an object management program for establishing correspondence between objects and the profile information file 110 and performing input/output operation to and from the profile information file 110, and a reference numeral 210 denotes a kernel portion for providing system calls utilized when the object management program 209 makes access to the file system 211

Operations of the various programs will be considered below

The object management program 209 serves to ensure for all the file systems to be handled in the work station (each of which system is composed of a directory and a file) that the profile information file 110 storing the profile or attribute information concerning the object and the resource for storing the content of the object are always present to be available in a pair. In addition, the object management program 209 serves to back up the input/output operation to and from the profile information file 110.

Figure 3:
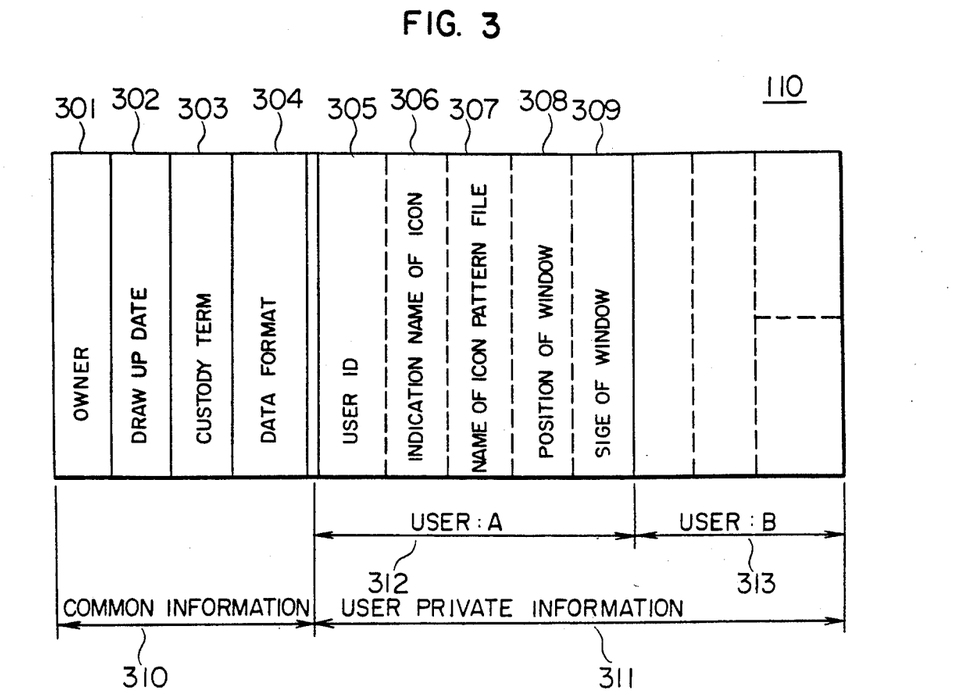
FIG. 3 is a view for illustrating contents of a profile (attribute) information file (110) shown in FIG. 1.

FIG. 3 is a view illustrating the contents of the profile (attribute) information file 110. The profile information file is provided on an object basis and contains common information 310 concerning the object and user private information 311 which can be prepared by each user. The common information 310 includes, for example, an owner field 301 for the information about the owners of objects, a draw-up date field 302 for the information of the date when an object was prepared, a custody term field 303 for the information of custody term, a data format field 304 for the information about object data formats for identifying the application programs or APs required for processing objects, and others. On the other hand, the user private information 311 is adapted to be utilized for designating on a user basis such information as required for displaying the objects in terms of icons on the display screen 105 and includes items such as user identification (ID) 305, icon indication name 306, file name 307 of the file storing the graphics pattern of the icon, window display position 308, window size 309 and others. Unless the user private information 311 proper to the user has been registered, a common object name is used as the indication name of the icon, while data prepared previously by the system is utilized for the other items.

Figure 4:
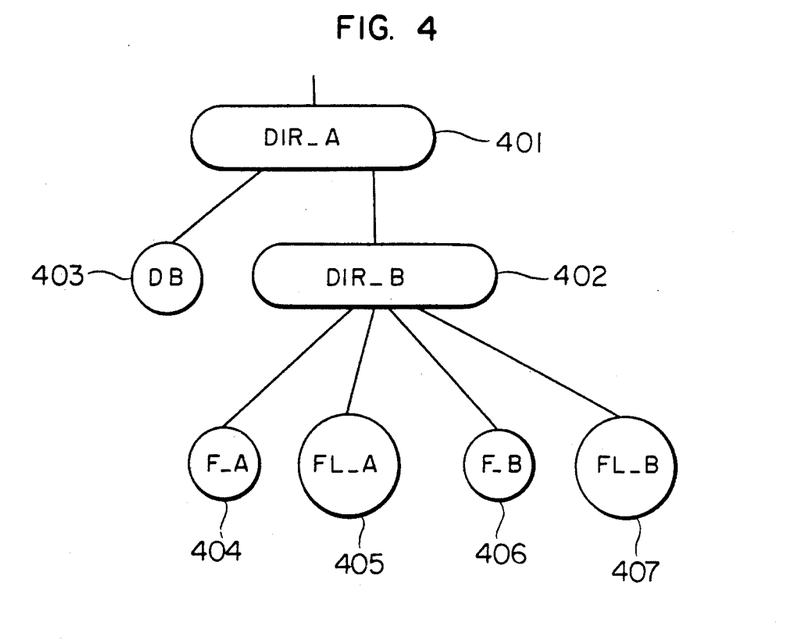
FIG. 4 is a view for illustrating the location where the file (110) is present.

FIG. 4 is a view for illustrating relationships between the profile information file and directory. The profile information file of an object is linked to a parent directory to which the object is linked. By way of example, referring to FIG. 4, a profile information file (D-B) 403 of a directory (DIR-B) 402 is linked to a parent directory (DIR-A) 401, while profile information files (F-A) 404 and (F-B) 406 of files (FL-A) 405 and (FL-B) 407, respectively, are linked to a directory (DIR-B) 402.

Figure 5:
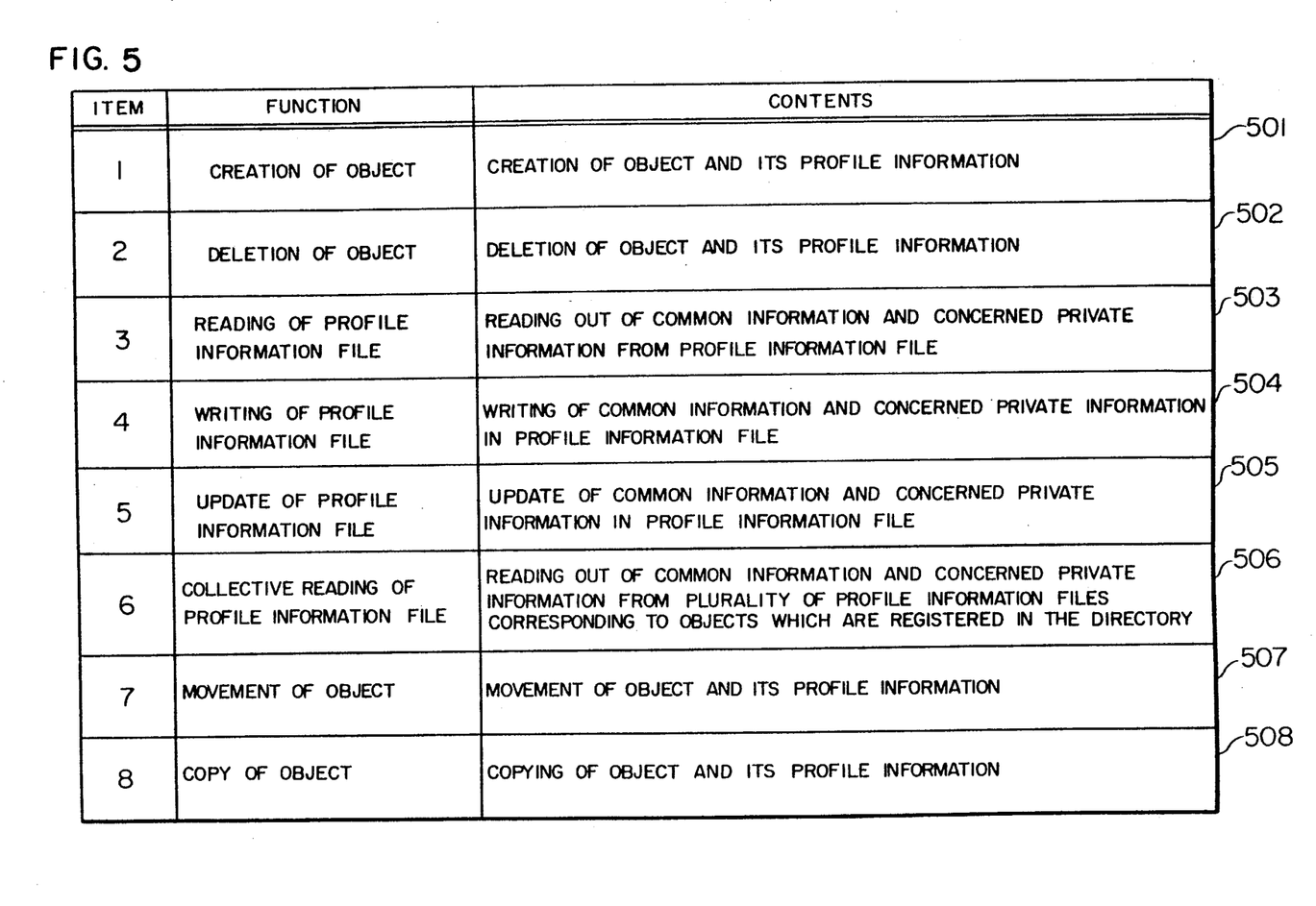
FIG. 5 is a view for illustrating functions of an object management program (209) shown in FIG. 2.

FIG. 5 is a view for illustrating functions of the object management program 209. As is shown in this figure, the object management program 209 executes processings such as creation of an object (501), deletion thereof (502), movement of an object (507), copy of an object (508), reading of the profile information file (503), writing of the profile information file (504), updating of the profile information file (505), and collective reading of the profile information file (506). The processing of the user private information stored in the profile information file can be performed in such a manner that the user ID inputted at the start of operation of the work station by the user is utilized as key data for searching the user private information field 311 to obtain the user private information corresponding to the inputted ID. The names of the profile information files can be automatically made available by converting the sequence numbers attached to all the directories and the files constituting the file system to character strings through the kernel portion 210.

Figure 6:
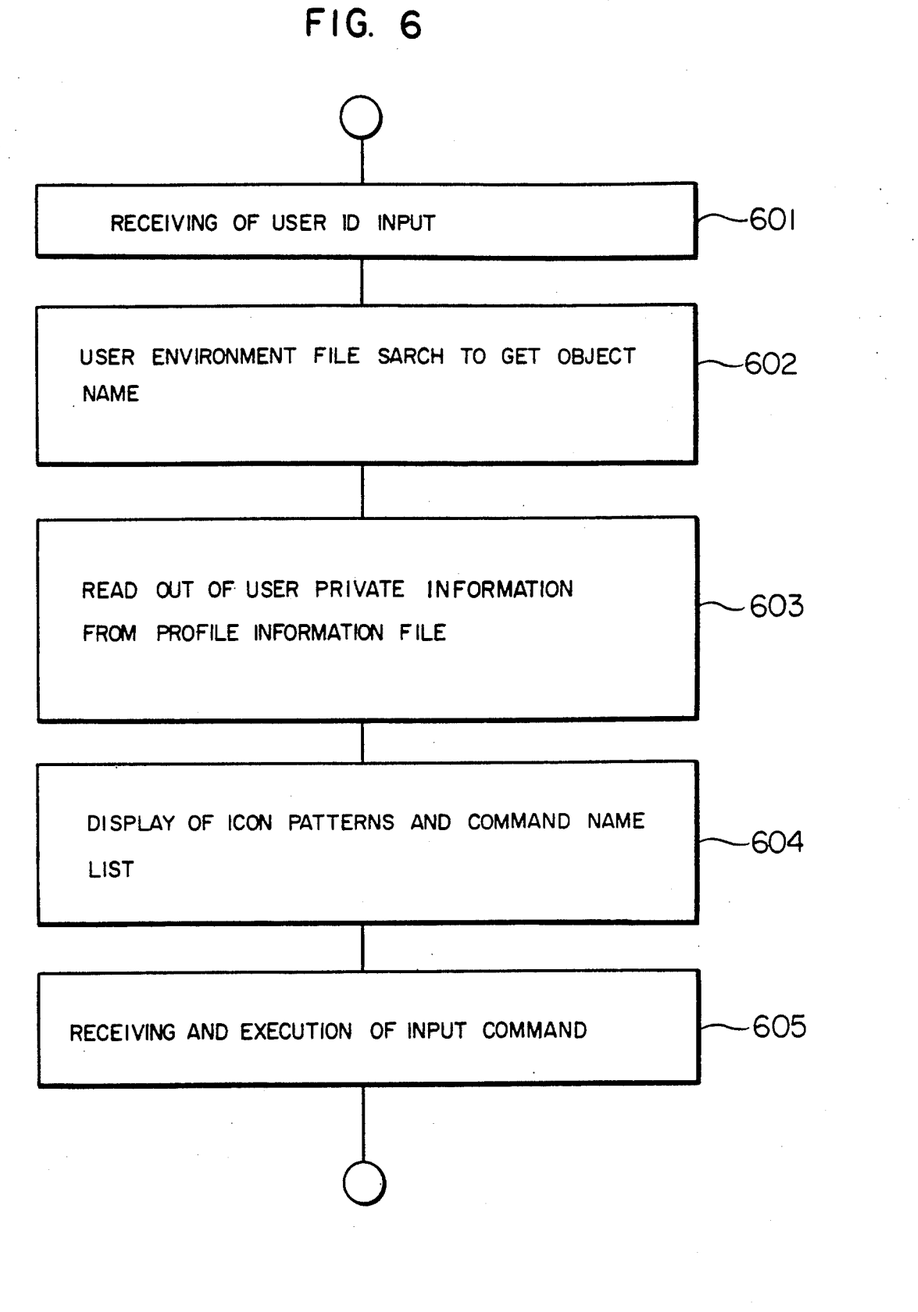
FIG. 6 shows a flow chart for illustrating operations executed by a job control program (201) shown in FIG. 2.

FIG. 6 illustrates in a flow chart the operation of the job control program 201 for carrying out the present invention.

At a step 601, the user ID is received which is inputted through the keyboard 104 upon starting operation of the work station by an operator.

At a step 602, the user environment file 112 stored in the disc 107 is retrieved with the user ID inputted at the step 601 being used as the key.

At a step 603, the object management program 209 is activated for the purpose of displaying the list of usable objects as obtained at the step 602 on the display 105 in terms of icons by reading out sequentially the user private information required for the display from the profile information file 110 for the objects in concern.

At a step 604, the icon pattern read out from the icon pattern data file 111 in accordance with the icon display name 306 and the icon pattern file name 307 for the object obtained at the step 603 is displayed on the display unit 105. Further, a list of commands accepted by the job control program 201 for the objects being displayed is also displayed on the display unit 105.

Figure 7:
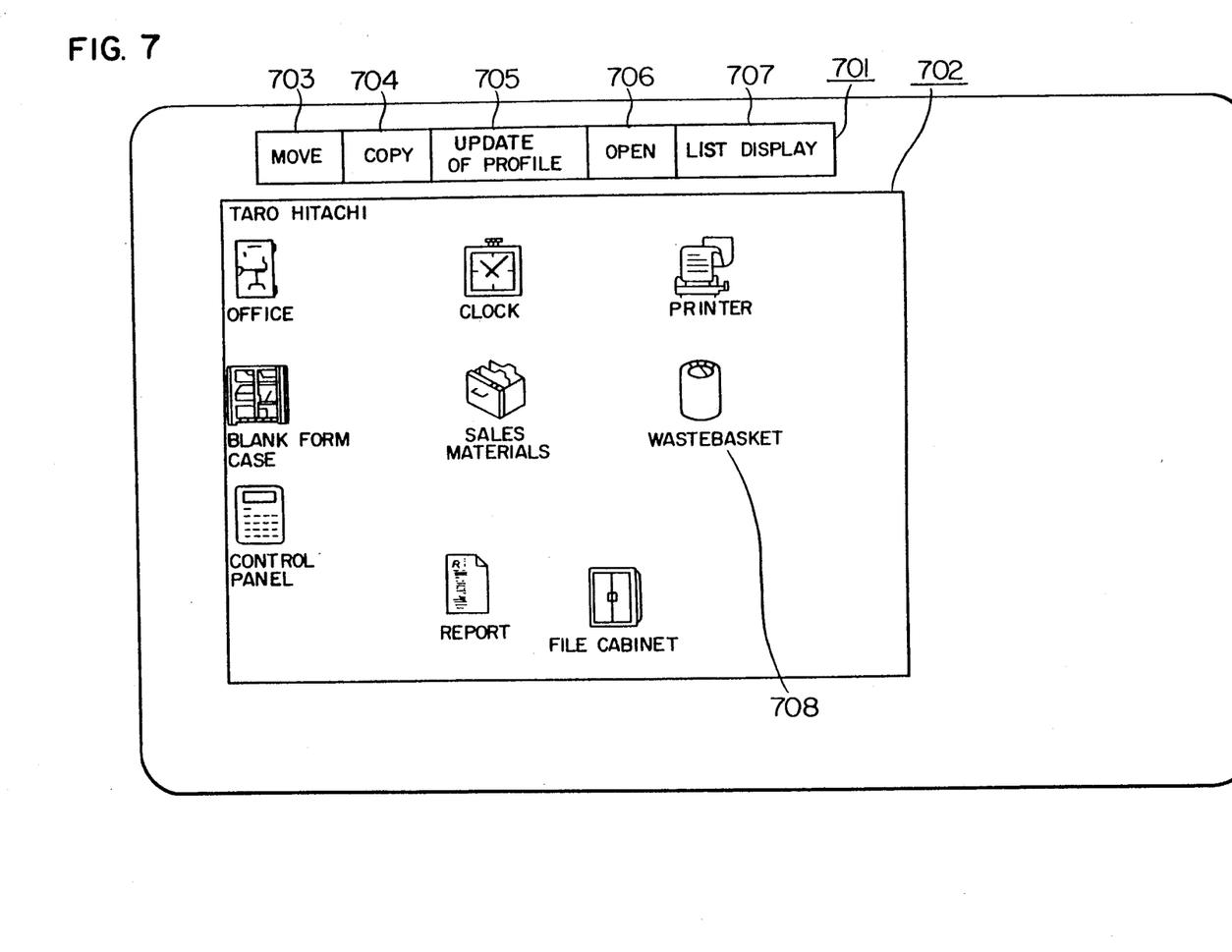
FIG. 7 is a view showing an example of an icon image display produced by executing the above-mentioned job control program.

FIG. 7 shows an example of the image displayed at the aforementioned step 604. In the figure, a reference numeral 702 designates a displayed list of icons registered by the user and named "Hitachi Taroh", and 701 designates a displayed list of commands received by the job control program 201. In the case of the illustrated example, the commands being displayed includes an object move command 703, an object copy command 704, a profile update command 705 for commanding the content updating for the object profile information file, a list display command 707 for displaying the members registered as the objects in a list, and an open command 706 for activating the AP for displaying the contents of the objects and processing the objects. An operator can designate the object and the command to be processed with the aid of the mouse 103.

As a step 605, the program for processing the command designated by the operator is activated. More specifically, the "MOVE" command 703 and the "COPY" command 704 activates the object moving/copying program 202. The "PROFILE UPDATE" command 705 activates the profile information file entry/update program 204. The "OPEN" command 706 activates the AP management program 205. The "LIST DISPLAY" command 707 activates the object list display program 203.

Upon manipulation of the work station following the registration of the user ID by the operator, the unwanted objects can be erased by moving them to a waste basket 708 under the "MOVE" command 707, since all types of objects are displayed at that time. Further, because the graphic patterns and the names of the icons are defaulted at this time point, it is necessary to designate the "PROFILE UPDATE" command 705 for updating individual profiles.

Figure 8:
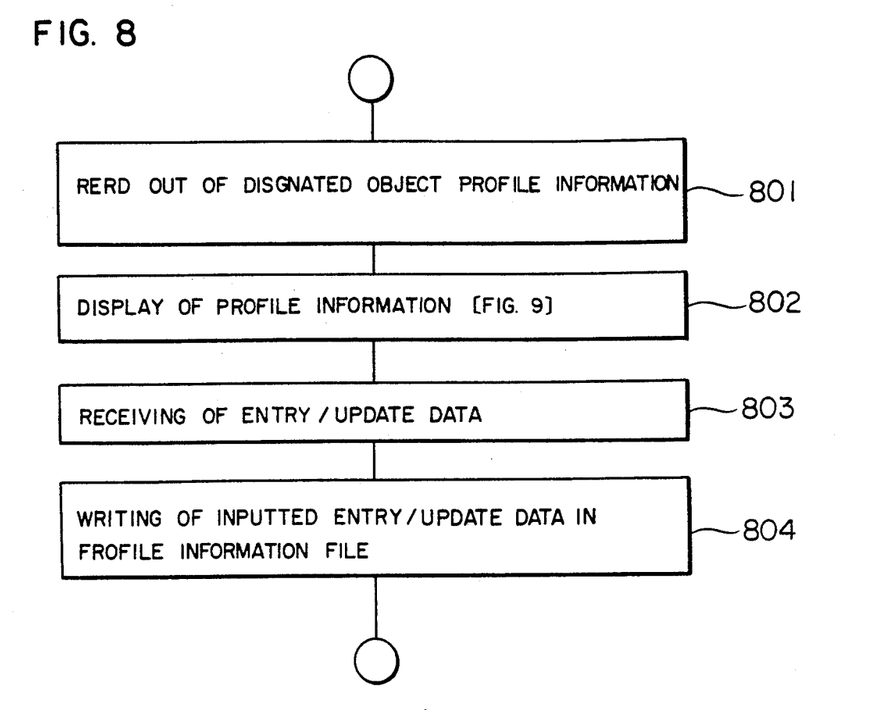
FIG. 8 shows a flow chart for illustrating a profile information file entry/update program (204) shown in FIG. 2.

FIG. 8 illustrates in a flow chart the operation of the profile information file entry/update program 204.

At a step 801, the object management program 209 is activated, and the profile information of the designated object is read out from the profile information file 110. In that case, a profile information file input function 503 of the object management program 209 is made use of.

Figure 9:
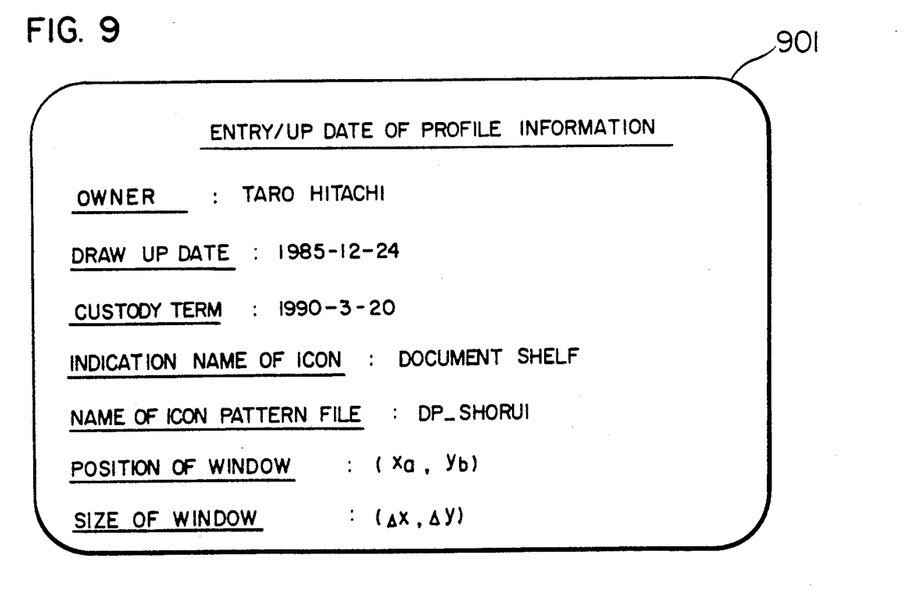
FIG. 9 is a view showing an example of a displayed image produced by executing the above-mentioned profile information file entry/update program.

At a step 802, the profile information read out at the step 801 is displayed on the display unit 105 in an image format illustrated in FIG. 9 by way of example.

At a step 803, the operator is allowed to input the entry/update data of the profile information.

At a step 804, the object management program 209 is activated to write the registered and updated profile information into the profile information file. In this case, a profile information file creating function 504 and a profile information file updating function 505 are made use of.

Figure 10:
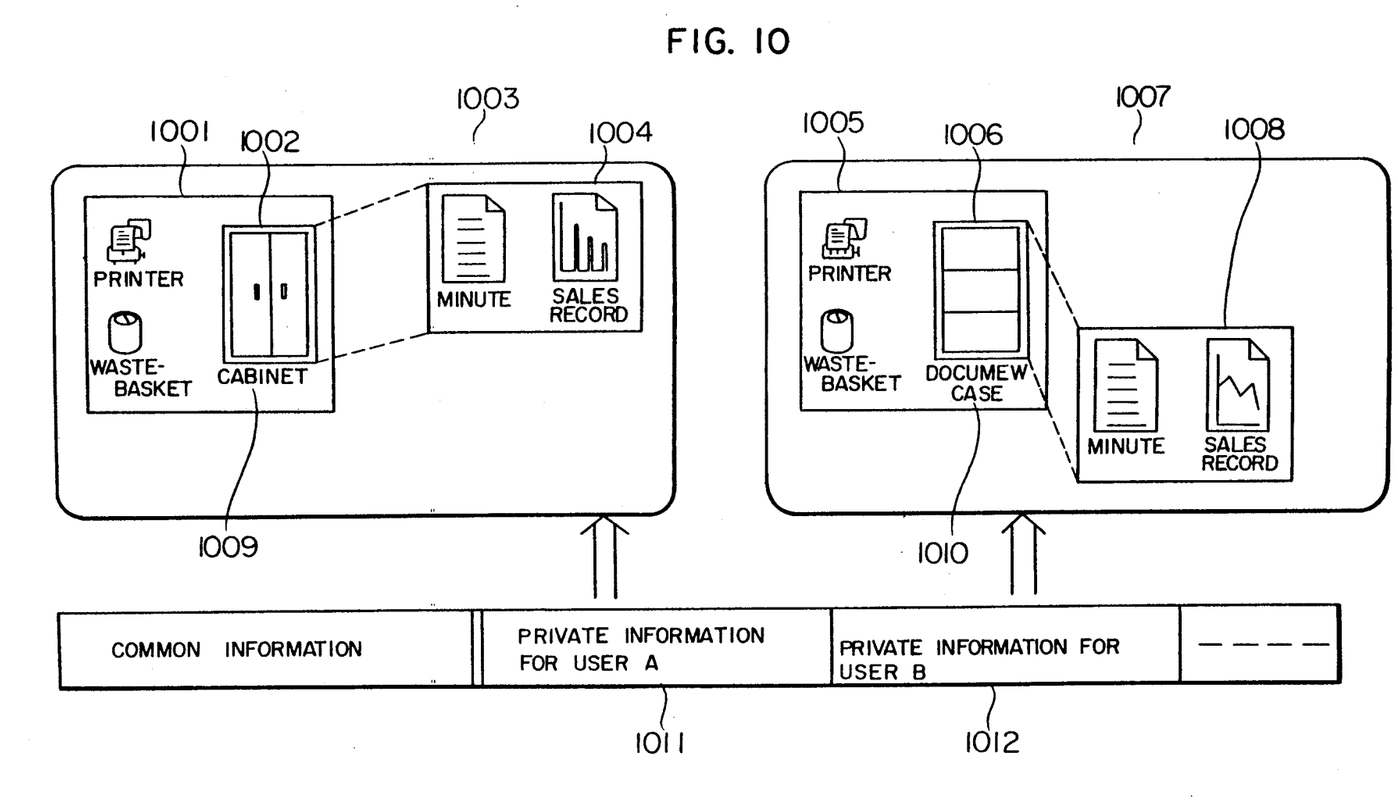
FIG. 10 is a view for illustrating operation performed by executing an object list display program (203) shown in FIG. 2.

FIG. 10 is a view showing that different graphic displays can be generated in dependence on the difference of the user private information, as an example for illustrating the operation of the object list display program 203. More specifically, the object list display program 203 is designed to display in terms of icons a list of those objects registered at the designated objects (in this case, the objects are limited to the directories of the file system). To this end, the collective profile information file inputting function 506 of the object management program 209 is made use of.

An example of the operation illustrated in FIG. 10 will be described in conjunction with the file system shown in FIG. 4. Referring to FIG. 4, it is assumed that the directory 402 has registered therein two files 405 and 407. For this directory 402, the user A sets to his or her private information 1011 stored in the profile information file 403 the information of an icon graphic pattern 1002 shown in an object list 1001 of an image 1003 being displayed, the display name "CABINET" 1009 and the information about the position and size of the cabinet window for displaying a list of the contents of the directory 402.

On the other hand, a user B places in his or her private information 1012 stored in the profile information file 403 the information about an icon graphic pattern 1006 shown in the object list 1005 of the image 1007 being displayed, the display name "DOCUMENT CASE" and the position and size of a document-case window 1008 for displaying the list of contents of the directory 402. Further, the users A and B set to respective profile information files 404 and 406 the information of respective icon graphic patterns and names to be displayed. As will now be appreciated from the above description, the image 1003 is displayed in the case of manipulation by the user A, while the image 1007 is displayed for the user B. In this connection, it should be mentioned that in the case of manipulation by a user whose private information is not set, the actual name (e.g. DIR-B) of the object is utilized as the name of display, while graphic patterns of defaults determined for all types of the objects such as the directories and files are utilized as the patterns to be displayed.

With the system illustrated above, there can be provided an easy and familiar man-machine interface because the user can display the objects in terms of logical names and preferred graphic patterns such as a cabinet, a minute book and so forth in place of the actual names of the objects such as DIR-A, FL-A and so forth.

The object move/copy program 202 shown in FIG. 2 executes the movement and copying of the object by making use of a moving function 507 and a copying function 508 of the object management program 209. When the destination to which an object is to be moved is the "WASTE BASKET" 708, a deleting function 502 of the object management program 209 is made use of for deleting the destination.

Figure 11:
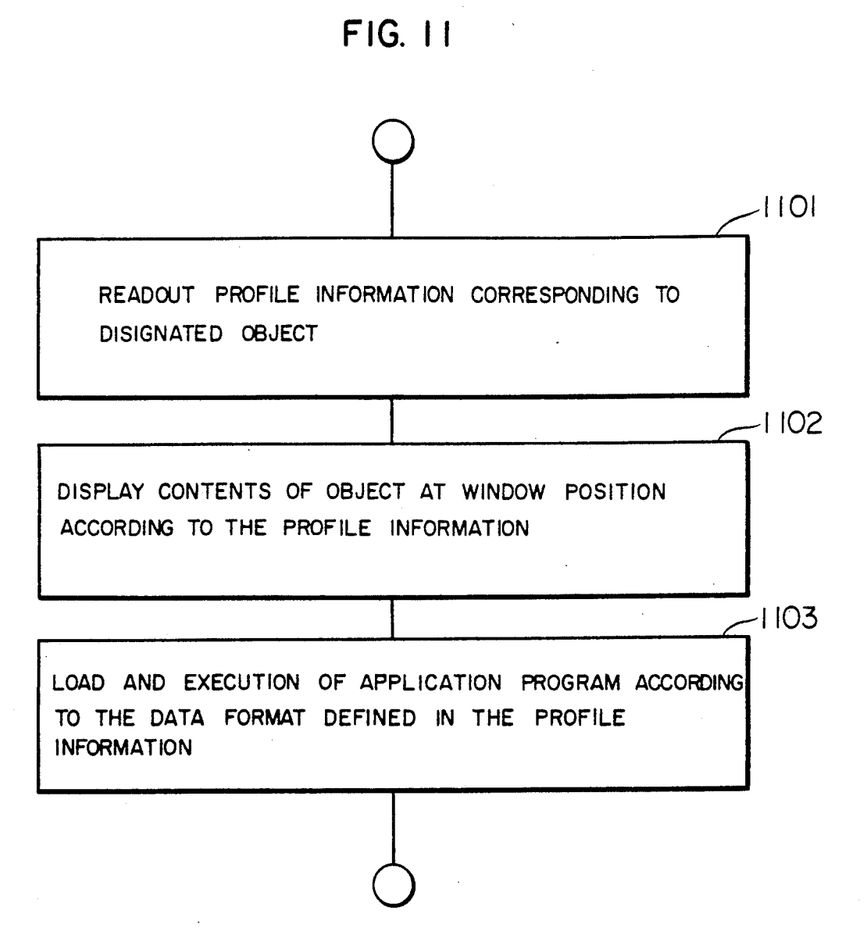
FIG. 11 shows a flow chart for illustrating operation performed by an AP (application program) management program (205).

FIG. 11 illustrates in a flow chart operation performed by the AP management program 205.

At a step 1101, the object management program 209 is activated to thereby allow the profile information of an designated object to be read out from the profile information file. In this case, a profile information reading function 503 of the object management program 209 is utilized.

At a step 1102, the content of the designated object is inputted with the aid of the system call provided by the kernel portion 210 to be thereby displayed on the display unit 105 in accordance with the information about the window display position 308 and the window size 309 contained in the profile information read out at the step 1101.

At a step 1103, the AP corresponding to the data format 304 contained in the profile information read out at a step 1101 is loaded to thereby initiate the processing for the designated object. More specifically, when the data format 304 is table data, a table processing program 207 is loaded while the text editing program 206 is loaded when the data format 304 is the text data, whereby the processing is initiated.

As will be appreciated from the foregoing description, it is possible according to the teachings of the present invention to set in an arbitrary manner the graphic patterns of icons representative of objects, the names thereof and the display position to be processed by the work stations. Accordingly, when one and the same apparatus is used in common by a plurality of users, each user can derive the optimum icon display conforming to the environment in which the apparatus is employed.

We claim:

1. In a multi-user data processing system, means for designating resources, which are available for use in data processing, by displaying said resources in the form of graphic patterns and identifying names thereof, comprising:
 first file means for storing respective resource identifying information to identify resources in correspondence with respective user identifying information assigned to individual users;
 second file means for storing graphic patterns of said resources and identifying names thereof in correspondence with respective resource identifying information for each individual user;
 display means including a display screen capable of displaying a plurality of graphic patterns and identifying names thereof;
 input means for inputting user identifying information in precedence to execution of data processing;
 control means responsive to the inputting of said user identifying information for reading out the resource identifying information corresponding to said inputted user identifying information from said first file means and for reading out specified ones of the graphic patterns and the identifying means thereof from said second file means on the basis of said resource identifying information read out from said first file means to output said read out graphic patterns and identifying names to said display means for display on said display screen; and
 designating means for designating selectively one of the plural graphic patterns or identifying names thereof displayed by said display means to identify resources for use in performing data processing.

2. A data processing system according to claim 1, wherein said first file means stores data defining window regions on said display screen in correspondence with said user identifying information,
 said control means outputting the graphic patterns and the names thereof read out from said second file means to said display means for display on said display screen within said window region.

3. A data processing system according to claim 1, including third file means for storing information for discriminatively identifying specific programs in correspondence with said resources,
 the data processing being executed according to one of said programs corresponding to the resource selected by said designating means.

4. A data processing system for displaying resources, which are available for use in data processing, in the form of graphic patterns, comprising:
 display means provided with a display screen for displaying a plurality of graphic patterns indicating different resources, respectively, and a plurality of commands;
 file means for storing graphic patterns specific to users and corresponding to said resources and for storing corresponding identifying names of said resources for said users;
 input means for inputting user identifying information in precedence to execution of data processing;
 control means responsive to user identifying information from said input means for outputting to said display means the graphic patterns corresponding to the inputted user identifying information, the identifying names of the resources read out from said file means and predetermined commands;
 position designating means for designating a position on said display screen; and
 means responsive to designation of one of said commands on the display means by said position designating means for effecting data processing in accordance with the selected command using the resource corresponding to one of said graphic patterns or names on the display screen selected by said position designating names.

5. A data processing system for displaying resources, to be used in data processing, in the form of graphic patterns, comprising:
 file means for storing graphic patterns representing resources corresponding to a user code assigned to an individual user;
 input means operated by a user to input a user code;
 data processing means responsive to said input means for reading out from said file means a plurality of graphic patterns corresponding to the user code inputted by said input means;
 display means for displaying on a screen said graphic patterns read out from said file means by said data processing means; and
 designating means operated by the user for specifying one of said graphic patterns on the screen;
 said data processing means including means responsive to said designating means for performing data processing on a resource corresponding to said graphic pattern specified by said designating means.

6. A data processing system according to claim 5, wherein said data processing means further comprises means for preliminarily storing commands corresponding to said resources and means for reading out a plurality of commands from said command storing means for display on the screen of said display means together with said graphic patterns, said data processing means performing data processing in response to the designation of one of said commands by said designating means.

7. A data processing system for performing data processing by using resources selected by designating icons displayed on a display screen, comprising:
 first memory means for storing resource identifies to identify each of said resources in correspondence with user identifiers assigned to individual users;
 second memory means for storing icons of said resources in correspondence with said resource identifiers for each of said users;
 display means including a screen capable of displaying a plurality of icons;
 input means for inputting a user identifier;

data processor means responsive to the inputting of said user identifier from said input means for reading out the icons corresponding to said user identifier from said second memory means by using resource identifiers, corresponding to said inputted user identifier, obtained from said first memory means and for outputting the read out icons to said display means for display on said screen; and pointing means for designating at least one of the icons displayed on the screen to select a resource for the data processing desired by the user.

8. In a multi-user data processing system, means for designating one of resources, which are available for use in data processing, by displaying said resources in the form of graphic patterns and names, comprising:

resource file means for storing a plurality of resources;

first file means for storing at least one set of resource identifying information to identify resources in correspondence with user identifying information assigned to individual users;

second file means for storing a plurality of profile data files in correspondence with said resource identifying information for each of said resources, each of said profile data files having a plurality of personal data records, each for storing a personal graphic pattern of one of said resources and a name thereof in correspondence with said user identifying information;

display means including a screen capable of displaying a plurality of graphic patterns and names thereof read out from said second files means;

input means for inputting user identifying information in precedence to execution of data processing;

designating means for designating selectively one of the plural graphic patterns or names thereof displayed by said display means; and control means responsive to the inputting of said user identifying information via said input means for reading out the resource identifying information corresponding to said inputted user identifying information from said first file means, (b) reading out specified ones of the graphic patterns and the names thereof from said second file means on the basis of said inputted user identifying information and said resource identifying information read out from said first file means and (c) outputting said read out graphic patterns and names to said display means for display, and including means responsive to a designation by said designating means for specifying resource identifying information corresponding to said designated graphic pattern or name to identify one of the resources in said resource file means for use in performing data processing.

9. A data processing system according to claim 8, wherein said second file means stores data defining window regions on said display screen in correspondence with said user identifying information, said control means outputting the contents of an identified one of said resources read out from said resource file means on said display screen within said window region.

10. A data processing system according to claim 8, wherein said second file means stores information for discriminatively identifying specific programs in correspondence with said resources, the data processing being executed according to one of said programs corresponding to the resource selected by said designating means.

11. A data processing system for displaying resources, which are available for use in data processing, in the form of graphic patterns, comprising:

display means provided with a display screen for displaying a plurality of graphic patterns indicating different resources, respectively, and a plurality of commands;

memory means for storing a plurality of programs for executing data processing operations corresponding to said commands;

pattern data file means for storing a plurality of graphic patterns;

profile data file means for storing a plurality of profile data files corresponding to resource identifiers, each of said profile data files including a plurality of personal record areas, each of which stores user identifying information, an indicator to specify one of said graphic patterns stored in said pattern data file means and a resource name specific to an individual user and corresponding to one of said resources;

input means for inputting user identifying information in precedence to execution of data processing;

position designating means for designating a position on said display screen; and data processing means including first means responsive to user identifying information from said input means for outputting to said display means graphic patterns corresponding to the inputted user identifying information, the names of the resources read out from said pattern data file means and said profile data file means and commands prepared previously, second means responsive to designation of one of said commands on the display screen by said position designating means for specifying one of said programs for use in effecting data processing in accordance with the selected command, and third means responsive to designation of one of said graphic patterns or names on the display screen by said position designating means for specifying one of said resource identifiers in accordance with the selected graphic pattern or name.

12. A data processing system which displays a plurality of graphic patterns for the convenience of user's designation of a resource for use in data processing, comprising:

file means for storing a plurality of profile files prepared for said resources, respectively, each of said profile files including a resource identifier for identifying the resource and at least one graphic pattern representing the resource corresponding to a user code assigned to an individual user;

input means operated by a user to input a user code;

data processing means responsive to said input means for reading out from said file means a plurality of graphic patterns corresponding to the user code inputted by said input means;

display means for displaying on a screen said graphic patterns read out from said file means by said data processing means; and designating means operated by the user for specifying one of said graphic patterns on the screen;

said data processing means including means responsive to said designating means for performing data processing on a resource corresponding to a resource identifier in one of said profile files which includes said graphic pattern specified by said designating means.

13. A data processing system for performing data processing by using resources selected by designating icons displayed on a display screen, comprising:

first memory means for storing plural sets of resource identifiers to identify resources in correspondence with user identifiers assigned to individual users;

second memory means for storing resource identifiers and icons of said resources in correspondence with said user identifiers for each of said resources;

display means including a screen capable of displaying a plurality of icons;

input means for inputting a user identifier;

data processor means responsive to the inputting of a user identifier from said input means for reading out the icons corresponding to said user identifier from said second memory means by using one of said plural sets of resource identifiers corresponding to said user identifier in said first memory means for outputting the read out icons to said display means for display on said screen; and pointing means operated by a user to designate at least one of the icons displayed on the screen to select a resource for the data processing desired by the user;

said data processor means operating in response to said designating means so as to access said resource desired by the user of the basis of a resource identifier having a correspondence in said second memory means with an icon which is designated on the screen.

* * * * *